(12) United States Patent
Grziwok et al.

(10) Patent No.: US 11,162,527 B2
(45) Date of Patent: Nov. 2, 2021

(54) BALL AND SOCKET JOINT FOR DEVICE ENCLOSURE

(71) Applicant: Lilitab LLC, San Rafael, CA (US)

(72) Inventors: Bryan Rudolf Grziwok, Berkeley, CA (US); Adam Scott Aronson, San Rafael, CA (US)

(73) Assignee: Lilitab LLC, San Rafael, CA (US)

( * ) Notice: Subject to any disclaimer, the term of this patent is extended or adjusted under 35 U.S.C. 154(b) by 0 days.

(21) Appl. No.: 16/522,437

(22) Filed: Jul. 25, 2019

(65) Prior Publication Data

US 2019/0345974 A1 Nov. 14, 2019

Related U.S. Application Data

(63) Continuation of application No. 14/036,516, filed on Sep. 25, 2013, now Pat. No. 10,378,579.

(60) Provisional application No. 61/744,346, filed on Sep. 25, 2012.

(51) Int. Cl.
| | |
|---|---|
| *F16C 11/06* | (2006.01) |
| *F16M 11/14* | (2006.01) |
| *F16M 11/20* | (2006.01) |
| *F16M 13/00* | (2006.01) |

(52) U.S. Cl.
CPC ............ *F16C 11/06* (2013.01); *F16M 11/14* (2013.01); *F16M 11/2078* (2013.01); *F16M 13/00* (2013.01); *F16M 2200/022* (2013.01); *F16M 2200/024* (2013.01); *F16M 2200/041* (2013.01); *F16M 2200/065* (2013.01); *Y10T 403/32032* (2015.01); *Y10T 403/32631* (2015.01)

(58) Field of Classification Search
CPC ..... Y10T 403/32032; Y10T 403/32311; Y10T 403/32565; Y10T 403/32631; F16M 11/14; F16M 11/2078; F16M 2200/022; F16M 2200/065; F16M 13/00; F16M 2200/024; F16M 2200/041; F16C 11/06; F16C 11/106
See application file for complete search history.

(56) References Cited

U.S. PATENT DOCUMENTS

| | | | |
|---|---|---|---|
| 1,500,921 | A | 7/1924 | Mogens |
| 1,962,548 | A | 6/1934 | Zerk |
| 2,439,009 | A | 4/1948 | Kujawaki |
| 2,456,182 | A | 12/1948 | Goble |
| 3,638,973 | A | 2/1972 | Poletti |
| 3,984,075 | A | 10/1976 | Bahner |
| 4,986,059 | A | 1/1991 | Boutilier |

(Continued)

FOREIGN PATENT DOCUMENTS

| | | |
|---|---|---|
| EP | 2255998 | 12/2010 |

OTHER PUBLICATIONS http://armodilo.com/products/armotwist, Armodilo ArmoTwist, 2013, downloaded Sep. 25, 2013, 3 pages.

(Continued)

*Primary Examiner* — Matthew R McMahon
(74) *Attorney, Agent, or Firm* — Fish & Richardson P.C.

(57) ABSTRACT

One example of a ball and socket joint for a device enclosure includes a ball member configured to facilitate connection to an electronic equipment. The ball member includes a first portion, and a second portion configured to mate with the first portion to form a passage to pass one or more cables for connection to the electronic equipment. The ball and socket joint also comprises a socket comprising a hollow portion configured to receive the ball member.

12 Claims, 5 Drawing Sheets

(56) References Cited

U.S. PATENT DOCUMENTS

| | | |
|---|---|---|
| 5,280,871 A | 1/1994 | Chuang |
| 5,458,657 A | 10/1995 | Rasmusson |
| 5,918,844 A | 7/1999 | Ognier |
| 5,957,445 A | 9/1999 | Hagman et al. |
| 6,017,010 A | 1/2000 | Cui |
| 6,068,380 A | 5/2000 | Lynn |
| 6,343,006 B1 | 1/2002 | Moscovitch |
| 6,352,227 B1 | 3/2002 | Hathaway |
| 6,379,073 B1 | 4/2002 | Yoo et al. |
| 6,540,193 B1 | 4/2003 | DeLine |
| 6,767,153 B1 | 7/2004 | Holbrook |
| 6,877,709 B2 | 4/2005 | March |
| 7,007,901 B2 | 3/2006 | Kondo |
| 7,021,854 B2 | 4/2006 | Oliver |
| 7,100,881 B2 | 9/2006 | Worrall |
| 7,111,836 B1 | 9/2006 | West |
| 7,218,510 B2 | 5/2007 | Hillman et al. |
| 7,287,868 B2 | 10/2007 | Carter |
| 7,316,377 B2 | 1/2008 | Smed |
| 7,694,922 B2 | 4/2010 | Kim |
| 8,132,291 B2 | 3/2012 | Tsai et al. |
| 8,322,699 B2 | 12/2012 | Prell |
| 2003/0019511 A1 | 1/2003 | Liu |
| 2007/0120027 A1 | 5/2007 | Chang |
| 2007/0152116 A1 | 7/2007 | Madsen |
| 2008/0018039 A1 | 1/2008 | Prell |
| 2008/0031683 A1 | 2/2008 | Chao |
| 2010/0232869 A1 | 9/2010 | Ditzler et al. |
| 2010/0277821 A1 | 11/2010 | Roth |
| 2011/0229254 A1 | 9/2011 | Su |
| 2012/0061542 A1 | 3/2012 | Bostater |

OTHER PUBLICATIONS http://www.ipadenclosures.com/ipad_kiosk_enclosure/ipad_table_mounts_stands/axis-ipad-table-mount, iPad Enclosures LLC, Axis iPad Mount, 2013, downloaded Sep. 25, 2013, 4 pages.

Authorized Officer Lucia Van Der Leeden, Notification of Transmittal of the International Search Report and the Written Opinion; International Application No. PCT/US2013/061705 dated Jan. 3, 2014, 19 pages.

BALL AND SOCKET JOINT FOR DEVICE ENCLOSURE

CROSS REFERENCE TO RELATED APPLICATIONS

This disclosure is a continuation application and claims priority to U.S. application Ser. No. 14/036,516, filed Sep. 25, 2013, which claims the benefit of the priority of U.S. Provisional Application Ser. No. 61/744,346, filed Sep. 25, 2012, which are incorporated herein by reference in their entirety.

TECHNICAL FIELD

This disclosure relates to a support mechanism and apparatus, for example, for supporting tablet computers and other types of electronic equipment.

BACKGROUND

Flat screen display devices are often used in publicly accessible places, e.g., restaurants, departmental stores, bus/train stations, etc., to present information. Touch screens that are implemented in certain display devices facilitate interaction with users viewing the presented information. In a restaurant, for example, a display device (or a tablet computer) displaying a menu can be positioned either at an entrance or at each table. The touch screen on the display device can allow a user to interact with the display device, e.g., to browse the menu, to place an order, to browse the Internet while waiting for food, etc. Ball and socket joints can be implemented to mount the display devices to support posts to hold the display devices. The ball and socket joints can support the display devices and facilitate adjustment in multiple axes. In some situations, a display device may be coupled to a computer system to receive data and power. A tablet computer, which can be battery operated, may occasionally need to be coupled to a power source for recharging. In these situations, a cable that carries power or data (or both) may need to be connected to the display device either permanently or occasionally.

BRIEF DESCRIPTION OF THE DRAWINGS

Like reference numbers and designations in the various drawings indicate like elements.

DETAILED DESCRIPTION

This disclosure relates to a ball and socket joint design to support electronic equipment, e.g., tablet computers, smart phones, electronic readers and other electronic equipment that, in general, includes a display device to present information. The display device can be configured to present the information in one or more orientations (e.g., landscape orientation, portrait orientation, an intermediate orientation between landscape and portrait), e.g., by implementing a gyroscope. In some implementations, the ball and socket joint described here can be included in an enclosure to which the electronic equipment can be mounted. For example, the enclosure can be implemented at a restaurant to mount a display device that displays a restaurant menu.

The ball and socket joint described here includes a two-part ball member configured to assemble around a cable (or cables) to be connected to the electronic equipment. Such a design allows the cable, which can sometimes have large connectors, to pass through the joint. Nevertheless, the joint size remains relatively small and a range of movement of the electronic equipment is not inhibited. The design offers security and tamper-resistance to the electronic equipment, which, in some situations, can be provided in terminals and kiosks accessible to the public.

Moreover, the two-part ball member can allow passage of one or more cables, e.g., USB cables, power cables, other cables (or combinations of them), that have connectors on one or both ends. In contrast, a type of cable that can be passed through a single-part ball member with a passage formed (e.g., drilled) in the single-part ball member can be limited, at least in part, by a size of the passage. Because the two-part ball member allows routing of complete, standard cables, the two-part ball member not only facilitates economic manufacture and mass production of the ball and joint assembly but also allows replacement of a cable with another (sometimes different) cable when the electronic equipment is implemented in the field, e.g., in public terminals or kiosks (or both).

The joint can be implemented such that the electronic equipment can be pivoted about an axis perpendicular to an axis of the socket. The joint can enable rotation of the electronic equipment about an axis of the ball shaft independent of a pivot angle. As described below, the joint can include stops to control (e.g., limit) a pivoting movement of the electronic equipment. In some implementations, the joint can include positive stops at the limits of axial rotation to control (e.g., limit) display orientation. The joint can also be implemented to disable axial rotation while allowing pivoting movement. In some implementations, the joint can be locked disabling both axial rotation and pivoting movement. The joint can be designed to include a preload that stiffens the joint so that the joint can support a weight of a payload, e.g., the electronic equipment.

Figure 1:
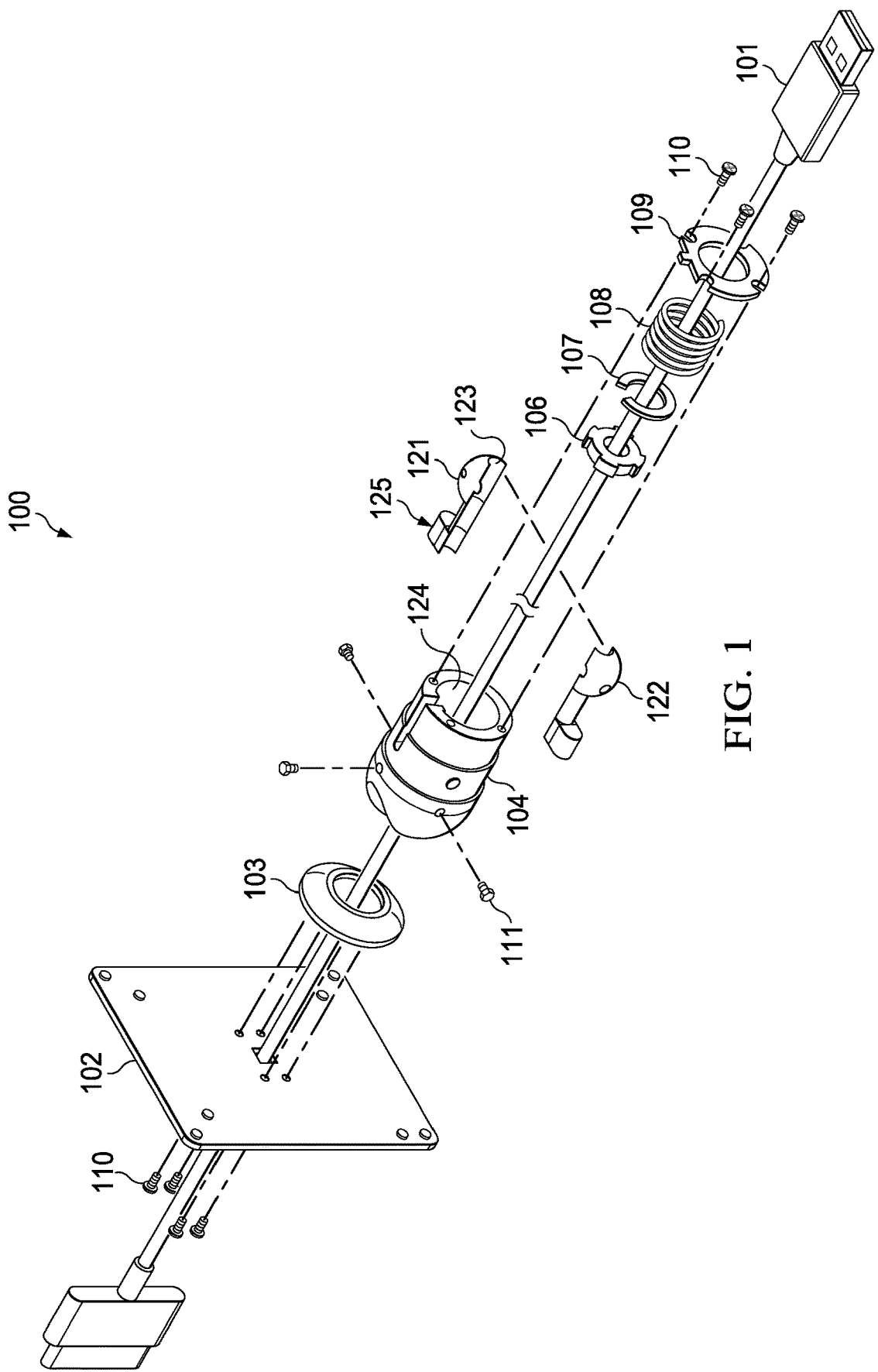
FIG. 1 illustrates a first implementation of an example ball and socket joint assembly.

FIG. 1 illustrates an example ball and socket joint assembly 100. The ball and socket joint assembly 100 includes a ball member 105 configured to facilitate connection to electronic equipment (e.g., a tablet computer, an electronic reader). The ball and socket joint assembly 100 can alternatively, or in addition, be implemented to facilitate connection to non-electronic equipment, e.g., a placard including printed information. The ball member 105 includes a first portion 121 and a second portion 122 configured to mate with the first portion 21 to form a passage 123 to pass one or more cables 101 for connection to the electronic equipment. In some implementations, the first portion 121 and the second portion 122 can be equal halves (e.g., identical halves), while, in other implementations, the first portion 121 and the second portion 122 can be of different sizes which, when assembled, forms the ball member 105 with the passage 123. Each of the first portion 121 and the second portion 122 can be manufactured as a die-cast part configured to be joined together to form the ball member 105.

The ball and socket joint assembly 100 includes a socket 104 that includes a hollow portion 124 configured to receive the ball member 105. In some implementations, the socket 104 can have a cylindrical cross-section for mounting to an end of a cylindrical tube. In some implementations, the cross-section can be different from cylindrical, e.g., square, rectangular, and other non-cylindrical cross-sections. In some implementations, the socket 104 can be implemented as flat or shaped plates or panels (or combinations of them).

The ball member 105 can include an elongated hollow portion 125 configured to pass through the hollow portion 124 of the socket 104. The elongated hollow portion 125 of the ball member 105 can at least partially extend outside the socket 104 to facilitate connection to the electronic equipment. By doing so, the elongated hollow portion 125 can extend the passage 123. The elongated hollow portion 125 can have a cross-section that is the same as or different from the cross-section of the socket 104. As described below, one or more cables can be routed through the hollow portion 124 of the socket 4 and the elongated hollow portion 125 of the ball member 105. The cable can be any type of cable (e.g., data cable, power cable, USB cable) regardless of the size or shape of connectors on either end of the cable.

The joint assembly 100 can be assembled in any order, e.g., by routing a cable 101 through a mount plate 102, a cover 103, the socket 104, and a spring member 108, as shown in FIG. 1. The mount plate 102 can have a square or any other shape. The first portion 121 and the second portion 122 of the ball 105, a cup 106, and, in some implementations, a shim 107 can be positioned around the cable 101 between the cup 106 and the spring member 108. For example, one or more stacked shims can be disposed between the spring member 108 and the cup 106, and can be configured to enable incrementally adjusting a stiffness of the joint. The ball member 105, the cup 106, the shim 107, and the spring member 108 can then be inserted into the socket 104, and held in place with the plate 109 and screws 110. The plate 109 can hold the spring member 108 in a compressed and pre-loaded condition to provide stiffness to the joint assembly 100. In some implementations, the spring member 108 can be a coil spring while, in others, the spring member 108 can be any spring-like member including, e.g., a Belleville washer or other flat spring. Such a washer or flat spring may be slotted to facilitate easy assembly of the cable 101. The cover 103 can be secured to the mount plate 102, which, in turn, can be secured to the ball member 105 with one or more additional screws 110.

The joint assembly 100 can include movement control members configured to control a movement of the ball member 105 within the socket 104. In some implementations, the movement control members can include one or more set screws 111 positioned along an axis of pivoting (i.e., up-down or side-to-side motion) of the electronic equipment. For example, three or four set screws 111 can be threaded into the socket 104 to limit a movement of the joint assembly 100. As described below with reference to FIG. 2, the set screws 111 can be engaged or disengaged, e.g., by a user of the joint assembly 100, to control (e.g., limit) the movement of the joint assembly 100. For example, the one or more set screws 111 can be threaded into the socket 104 along the transverse axis to limit a pivoting of the electronic equipment about the transverse axis.

Figure 2:
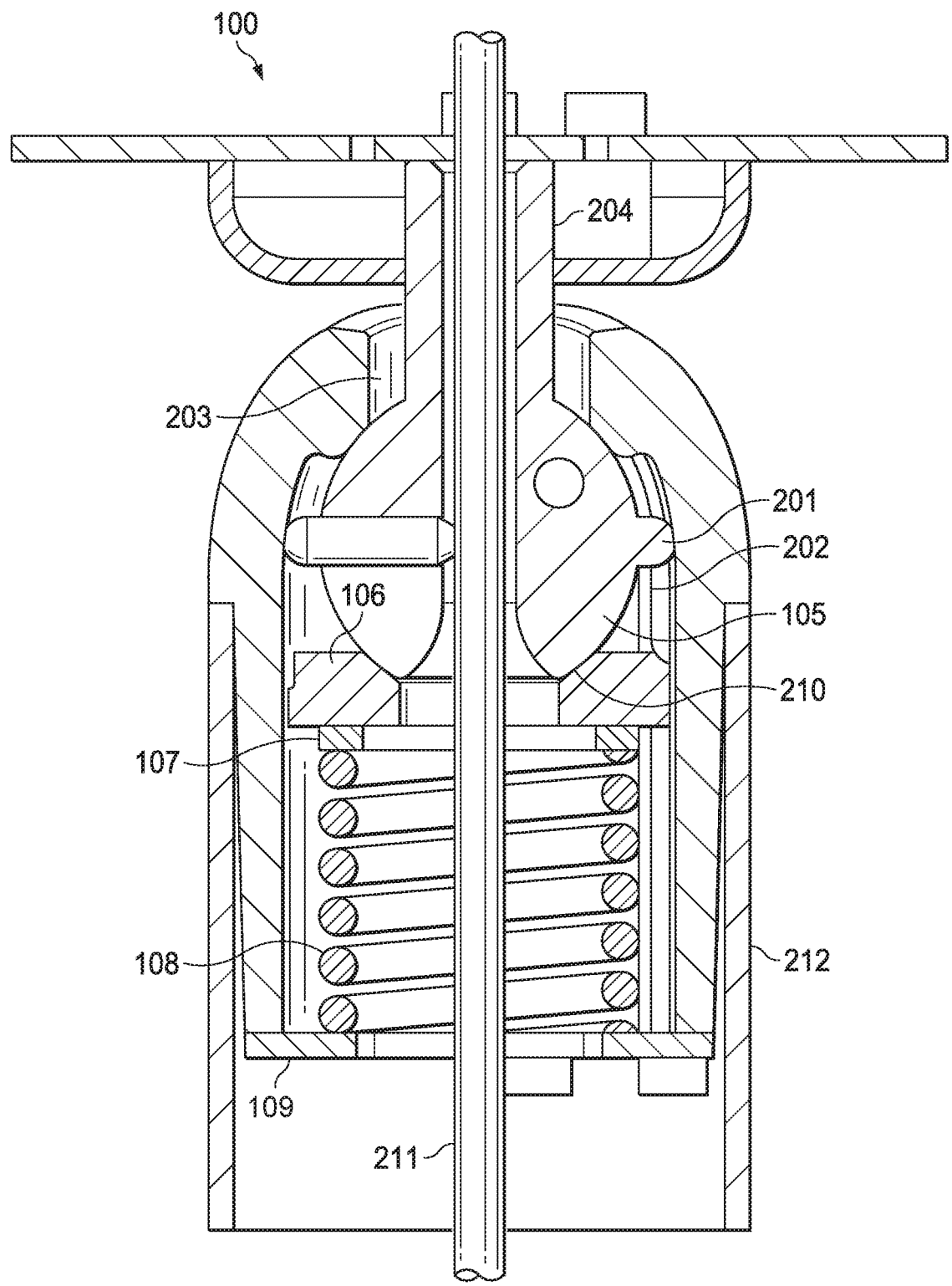
FIG. 2 illustrates a cross-sectional view of the example ball and socket joint assembly of FIG. 1.

FIG. 2 illustrates a cross-section of the example ball and socket joint assembly 100 of FIG. 1. The ball member 105 can include one or more pins (e.g., pin 201) attached to an exterior surface of the ball member 105. In some implementations, the first portion 121 and the second portion 122 of the ball member 105 can each include a respective pin. In such implementations, the ball member 105 formed by combining the two portions can include a pin on opposite sides of the ball member 105. The one or more pins can be configured to engage, e.g., mate with corresponding mating geometry, e.g., one or more shoulders such as shoulder 202, in an inner surface of the socket 104 to control a rotation of the ball member 105. In some implementations, the shoulders in the socket 104 can complement the pins in the ball member 105. The socket 104 can further include a slot 203 in a top surface of the socket 4 configured to receive a shaft 204 of the ball member 105. For example, the slot 205 can constrain the shaft 204 to pivoting movement in one axis.

The foregoing features of the joint assembly 100, in particular, the ball member 105 and the socket 104, can operate in cooperation to provide a controlled movement of the joint assembly 100 on two axes—a first axis that is perpendicular to the plane in which the slot 203 lies, and a second axis that is coaxial with the ball shaft 204. For example, the foregoing features can operate in cooperation to allow the range of pivoting motion to be constrained by a size of the slot 203 and an interaction of the one or more pins. The one or more shoulders can operate to provide hard stops aiding in the orientation of the electronic equipment, e.g., from portrait to landscape or vice versa. Also, the shoulders in the socket 104 can interact with the pins in the ball member 105 to constrain movement at the limits of the intended range, e.g., between horizontal (i.e., landscape orientation) and vertical (i.e., portrait orientation).

As shown in FIG. 2, the shim 107, the spring member 108 and the plate 109 can be compressed against the back of the cup 106 to create a preload inside the joint assembly 100. In this manner, the spring member 108 and the cup 106 can retain the ball member 105 in the socket 104 with a force that is sufficient to support a cantilevered weight of the electronic equipment connected to the ball member 105. Each of a number of shims, a stiffness of the spring member and a texturing in an interface 210 between the cup 106 and the ball member 105 can be adjusted, either individually or in any combination, to accommodate different load amounts, cantilever distances, and joint stiffness. Alternatively, or in addition, the finish, material or surface roughness/patterning (or combinations of them) in the cup 106 or the ball member 105 (or both) can be varied to create an amount of friction between the parts to achieve a desired joint stiffness. Also, as shown in FIG. 2, a portion 211 of the cable 101 is internally routed through the joint assembly 100. The surfaces of the joint assembly 100 adjacent to the cable 101 can be shaped to have adequate clearance and to have edges with radius sufficient to not pinch the cable 101 in the range of motion of the joint assembly 100. In some implementations, the joint assembly 100 can be mounted in a tubular section 212, while, in others, the joint assembly 100 can be mounted to in a cross-section other than the tubular cross-section. In some implementations, the tube can be a fitting such as an elbow or a wall plate.

Figure 3:
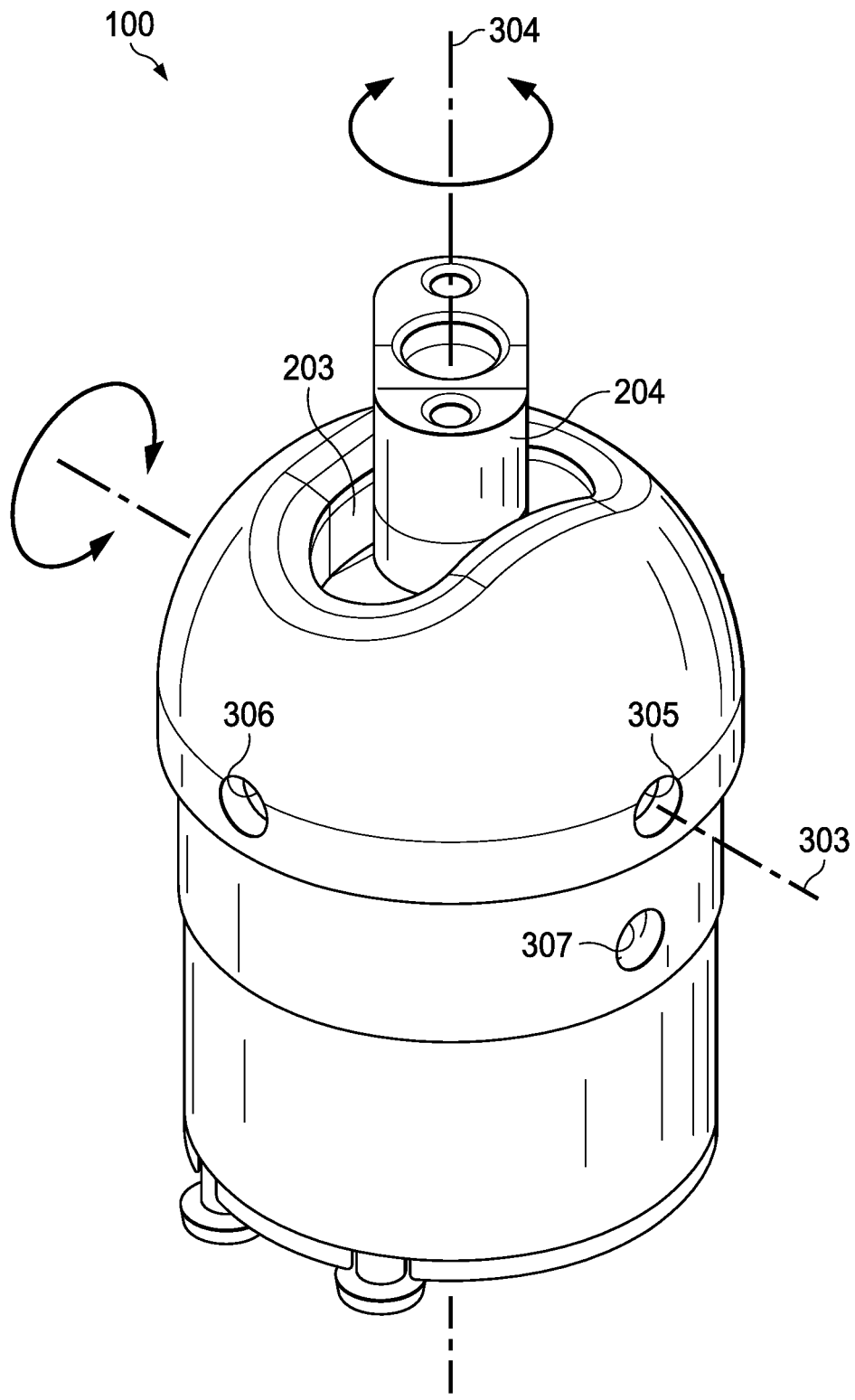
FIG. 3 illustrates a perspective view of the example ball and socket joint assembly of FIG. 1.

FIG. 3 illustrates a perspective view of the example ball and socket joint assembly 100 of FIG. 1. FIG. 3 illustrates the axes of rotation provided by the joint assembly 100. The shaft 204 of the ball member 105 is constrained by a slot 203 in the socket 104 to pivot about axis 303 (sometimes called a pivoting axis). The axis 303 can be used to pivot the electronic equipment to a specified viewing angle, e.g., an angle at which viewing is convenient and ergonomic. The length of the slot 203 can be modified (e.g., increased or decreased) and can be symmetric or asymmetric to provide a desired range of pivoting motion. The ball member 105 can, alternatively, or in addition, rotate about the axis 304 of the shaft 204 (sometimes called an orienting shaft). The axis 304 can be used to rotate the display, e.g., from a landscape orientation to a portrait orientation (or vice versa).

One or more of the set screws 111 can be positioned in opening 305 and in an opposing opening, e.g., an opening that is diametrically opposite to the opening 305 to limit movement of the joint to axis 303, e.g., to disable a rotation of the ball member 105. Also, one or more of the set screws 111 can be positioned in opening 306 and in an opposing opening to immobilize the ball member by locking up all movement of the joint assembly 100. Openings for securely mounting the joint assembly 100 can be implemented, e.g., as tapped holes at opening 307 and an opposing opening. The fixed and relative position of these mounting holes to the axes of rotation shown in FIG. 3 allows the joint assembly 100 to be oriented to move as desired by a user.

Figure 4:
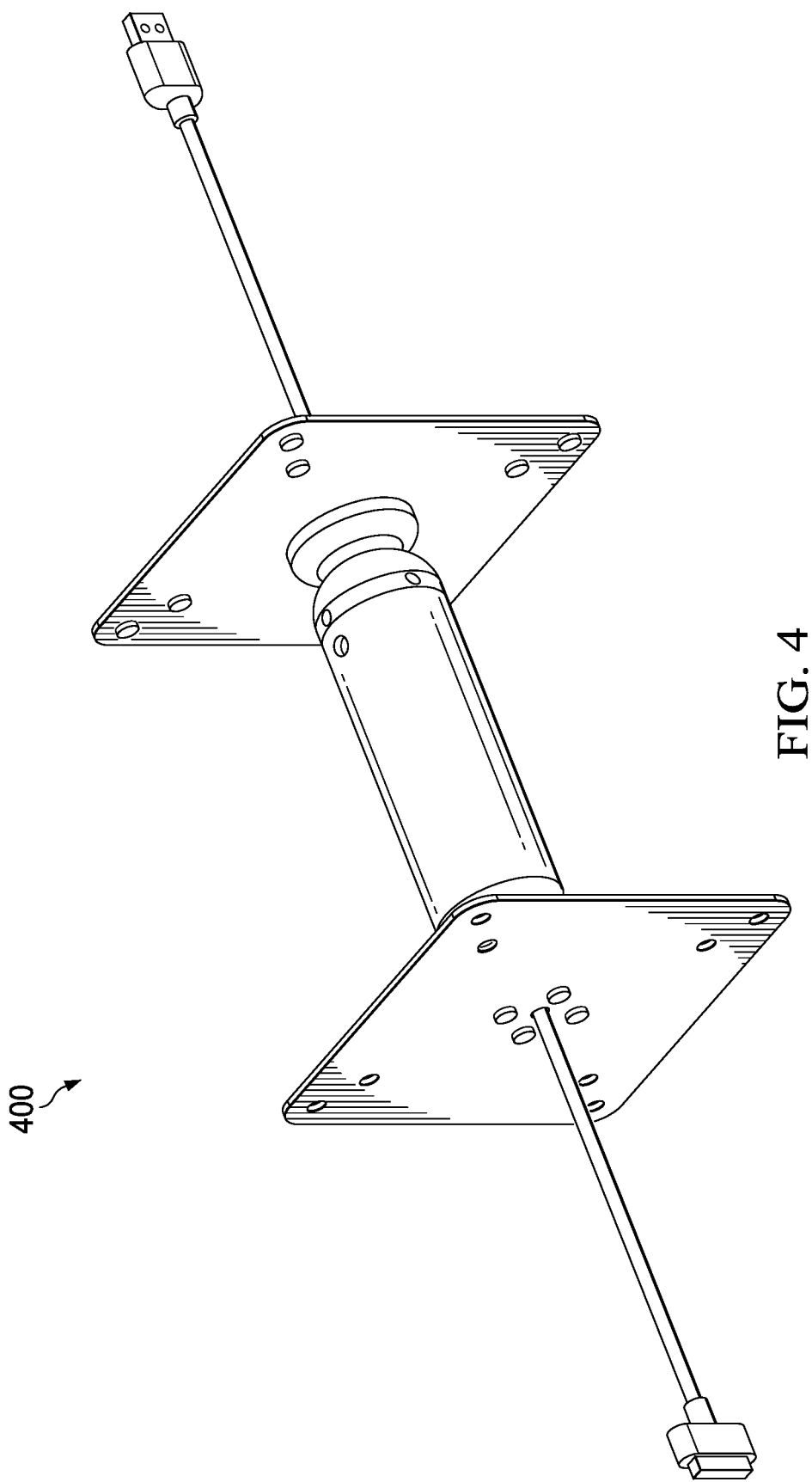
FIG. 4 illustrates a second implementation of an example ball and socket joint assembly.
Figure 5:
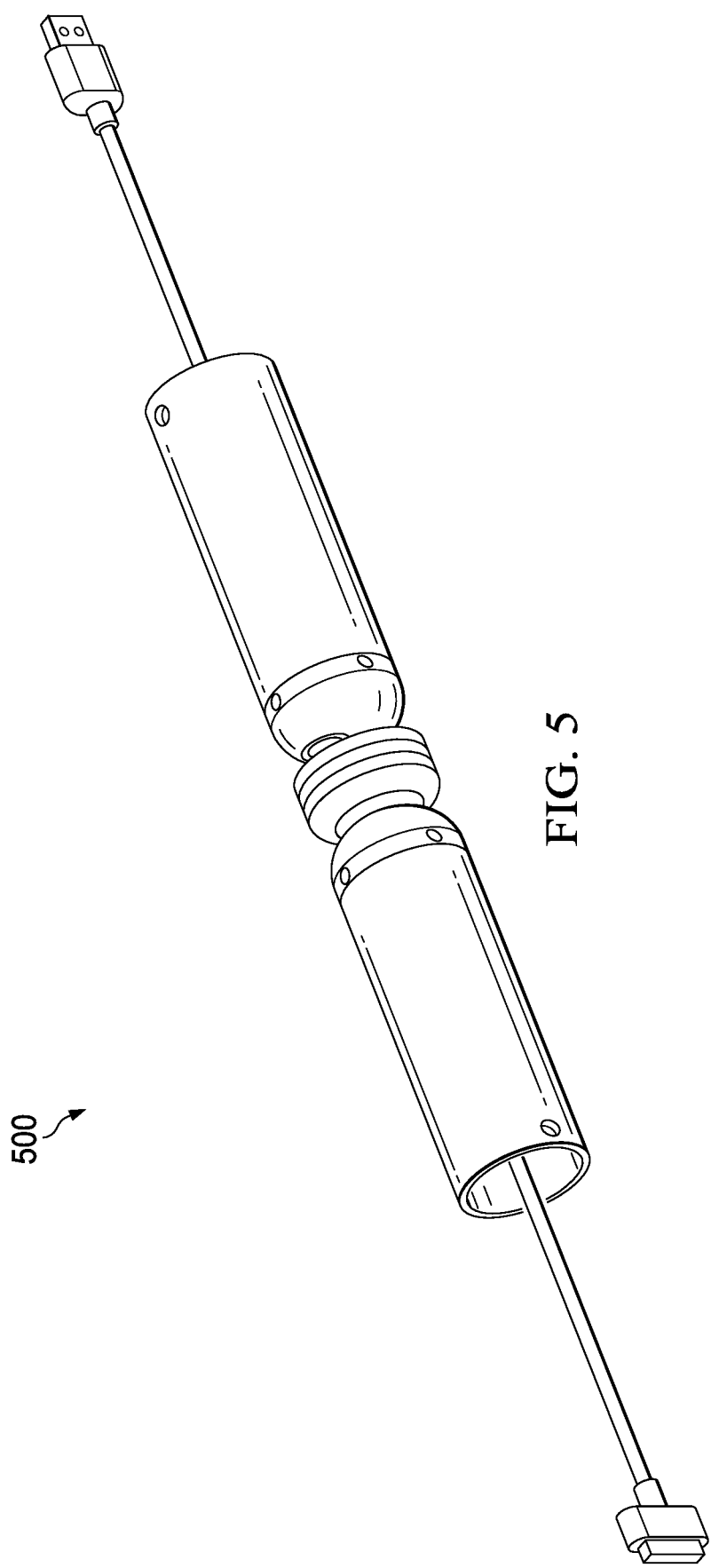
FIG. 5 illustrates a third implementation of an example ball and socket joint assembly.

FIGS. 4 and 5 illustrate a second implementation (400 in FIG. 4) and a third implementation (500 in FIG. 5), respectively, of an example ball and socket joint assembly. In some implementations, a first joint assembly and a second joint assembly connected in series with the first joint assembly can be implemented as a system for mounting electronic equipment. The first joint assembly can be configured to connect to the electronic equipment and can include a first ball member and a first socket similar to the ball member 105 and the socket 104, respectively. The second joint assembly can include a second ball member and a second socket similar to the ball member 105 and the socket 104, respectively. One or more cables to be connected to the electronic equipment can be routed through a passage formed by the two portions of the first ball member and the two portions of the second ball member. A first cover and a second cover can be positioned between the first joint assembly and the second joint assembly. In some implementations, a third joint assembly can be connected in parallel with either the first joint assembly or the second joint assembly.

The second and third implementations include multiply-articulated joints that can be created by assembling multiple joint assemblies shown in FIG. 1. Such joint assemblies can be disposed along an interior of an articulated arm or positioned at either end of the articulating arm, or both. Linkages can be formed by using two or more joint assemblies in series or in parallel (or both).

The orientation of the slots (e.g., slot 203 in FIG. 2) in such multiply articulated joints can be parallel to or at angles to each other. The positioning of the slots at angles to each other (e.g., perpendicular to each other) can allow the combined articulating arm to have a full range of motion, with rotation about three or more axes. The screws for limiting adjustment range (e.g., set screws 111 in FIG. 1) can be implemented in such implementations to strategically limit individual joints to pivoting only, locking out rotation about the axis of the shaft (e.g., shaft 204) of the ball member. Such an arrangement results in the articulated arm moving in a way that is intuitive and convenient for the user, and prevents elements of the articulated arm from rotating into a position in which the arm may bend or begin moving in an undesired manner. The adjustability of the joint stiffness can be useful in articulated arms containing multiple joints, e.g., in joints proximal to the mounting surface, which can be under greater cantilevered load relative to joints closer to the electronic equipment (or other supported display devices).

A number of implementations have been described. Nevertheless, it will be understood that various modifications may be made without departing from the spirit and scope of the disclosure.

The invention claimed is:

1. A ball and socket joint to mount electronic equipment, the ball and socket joint comprising:
    a ball member configured to facilitate connection to an electronic equipment, the ball member comprising a first ball member end and a second ball member end opposite the first ball member end along a longitudinal axis of the ball member, the first ball member end configured to be nearer to the electronic equipment than the second ball member end, the ball member comprising:
        a first portion; and
        a second portion configured to receive the first portion in a direction perpendicular to the longitudinal axis, the second portion configured to mate with the first portion to form a hollow passage along the longitudinal axis, the hollow passage configured to pass one or more cables for connection to the electronic equipment;
    a socket comprising a hollow portion, the socket having a first socket end and a second socket end opposite the first socket end along the longitudinal axis of the ball member, the first socket end configured to be nearer to the electronic equipment than the second socket end, wherein the second socket end is configured to receive the first ball member end, wherein the first socket end defines an aperture that is smaller than an aperture defined by the second socket end, wherein, when assembled, the ball member is positioned nearer the aperture defined by the first socket end than the aperture defined by the second socket end;
    a cup configured to receive the second ball member end;
    a plate fastened with screws to the second socket end;
    an axial compression spring member disposed between the plate and the cup to generate a frictional force between the ball member and the socket, and between the ball member and the cup, the frictional force sufficient to support a cantilevered weight of the electronic equipment connected to the ball member, wherein the plate is configured to retain the spring member in compression;
    a mounting plate connected to the first ball member end and configured to be connected to the electronic equipment; and
    cover connected to the mounting plate, the cover positioned between the first socket end and the mounting plate, the cover comprising an opening, wherein the first ball member end extends through the aperture in the first socket end and through the opening in the cover and abuts against the mounting plate.

2. The ball and socket joint of claim 1, wherein the ball member includes:
    a first shaft portion attached to the first portion of the ball member at the first ball member end; and
    a second shaft portion attached to the second portion of the ball member at the first ball member end, wherein the second shaft portion is configured to receive the first shaft portion in the direction perpendicular to the longitudinal axis, the second shaft portion configured to mate with the first shaft portion, wherein at least a portion of the first shaft portion mated with at least a portion of the second shaft portion passes through the first socket end and at least partially extends away from the first socket end to facilitate connection to the electronic equipment.

3. The ball and socket joint of claim 1, further comprising movement control members configured to control a movement of the ball member within the socket.

4. The ball and socket joint of claim 3, wherein the movement control members comprise one or more set screws positioned along an axis of pivoting of the electronic equipment, the one or more set screws configured to limit movement of the ball member to pivoting.

5. The ball and socket joint of claim 4, wherein the one or more set screws disable a rotation of the ball member.

6. The ball and socket joint of claim 3, wherein the movement control members comprise one or more set screws to immobilize the ball member.

7. The ball and socket joint of claim 3, wherein the ball member comprises mating geometry to engage with the movement control members.

8. The ball and socket joint of claim 3, wherein the movement control members comprise one or more pins attached to an exterior surface of the ball member, the one or more pins to mate with corresponding one or more shoulders in an inner surface of the socket to control a rotation of the ball member.

9. The ball and socket joint of claim 3, wherein the movement control members comprise one or more set screws to be threaded into the socket along a transverse axis perpendicular to the longitudinal axis to limit a pivoting of the electronic equipment about the transverse axis.

10. The ball and socket joint of claim 1, wherein either the cup or an outer surface of the ball member is textured.

11. The ball and socket joint of claim 1, wherein each of the cover and the mounting plate is configured to pass the one or more cables therethrough.

12. The ball and socket joint of claim 1, wherein the first portion of the ball member is identical to the second portion of the ball member.

* * * * *